United States Patent [19]

Fukawa

[11] Patent Number: 5,568,654

[45] Date of Patent: Oct. 22, 1996

[54] MOBILE RADIO TELECOMMUNICATIONS SYSTEM

[75] Inventor: Yasurou Fukawa, Hiratuka, Japan

[73] Assignee: Any Co., Ltd., Hiratuka, Japan

[21] Appl. No.: 224,771

[22] Filed: Apr. 8, 1994

[30] Foreign Application Priority Data

Oct. 7, 1993 [JP] Japan .................................. 5-251812

[51] Int. Cl.$^6$ .................................................. H04Q 7/00
[52] U.S. Cl. ...................... 455/33.1; 455/33.2; 455/54.1; 455/56.1
[58] Field of Search ................... 455/33.1, 33.2, 455/54.1, 53.1, 56.1, 63; 379/59, 60

[56] References Cited

U.S. PATENT DOCUMENTS

| | | | |
|---|---|---|---|
| 4,926,421 | 5/1990 | Kawano et al. | 370/95.1 |
| 4,955,082 | 9/1990 | Hattori et al. | 455/33 |
| 5,212,822 | 5/1993 | Fukumine et al. | 455/33.1 |
| 5,345,499 | 9/1994 | Benveniste | 379/59 |
| 5,425,031 | 6/1995 | Otsuka | 370/95.1 |

FOREIGN PATENT DOCUMENTS 4168815  6/1992  Japan .

OTHER PUBLICATIONS

"Design Features of a Premises Cordless Telephone System" by Minori Kawano et al, IEEE Vehicular Technology Conference on the Move in the 90's, May 1990, pp. 178–182.

Primary Examiner—Edward F. Urban
Assistant Examiner—Gertrude Arthur

[57] ABSTRACT

In a mobile radio telecommunications system having a switching unit, a control station connected to the switching unit, a plurality of base stations connected to the switching unit, and a plurality of mobile stations connected to the base stations by radio channels, the base stations are each situated at private property, and each includes a controller for determining a direction in which a mobile stations is moving. The controller receives via the control station and switching unit information representative of the levels at which the individual base stations have received a radio wave from a mobile station, compares the received levels, determines, based on the result of comparison, that one of the base stations having the highest received level currently covers the mobile station, and determines a direction in which the mobile station is moving on the basis of a transition of the highest received level.

7 Claims, 3 Drawing Sheets

MOBILE RADIO TELECOMMUNICATIONS SYSTEM

BACKGROUND OF THE INVENTION

1. Field of the Invention

The present invention relates to a mobile radio telecommunications system and, more particularly, to a mobile radio telecommunications system feasible for portable telephones. The present invention is also concerned with procedures for setting up connection for calls originating and terminating, switching a radio zone and a base station while a conversation is under way, and registering locations.

2. Description of the Related Art

Conventional mobile radio telecommunications systems include an automobile telephone and portable telephone system. It is a common practice with an automobile telephone and portable telephone system to arrange bidimensionally a plurality of base stations each covering a particular radio zone or service zone. The zones assigned to nearby base stations overlap each other in order to allow a conversation to be continued on a mobile station over the adjoining zones. This kind of system is referred to as a cellular radio telephone communication system.

In the conventional cellular radio telephone communication system, a mobile station accesses, for example, a landline telephone included in a wire-line telephone network by the following procedure. To begin with, the mobile station sends a calling signal to base stations adjoining it. In response, the base stations each sends a calling signal, including a received level thereof, to a radio channel control station. The radio channel control station selects one of the base stations whose received level is highest and determines that the mobile station exists in the zone assigned to that base station. Then, the control station sends the calling signal to a mobile telecommunications switching office. On receiving the calling signal, the switching office sets up connection between the base station of interest and the wire-line telephone network. To terminate a call at a mobile station, it is necessary to determine a zone currently covering the mobile station. This has customarily been done by calling a plurality of zones from the telephone network side by broadcasting in response to every terminating call, detecting a response from a mobile station of interest, i.e., a base station having the highest received level in order to locate the mobile station, and then terminating the call at the mobile station.

Assume that a mobile station is transferred from one zone to another zone while a conversation is held thereon. Then, to switch the zone, the base station whose zone currently covers the mobile station constantly monitors the level at which it receives a radio wave from the mobile station. When the received level of the base station falls below a predetermined value, the base station determines that the mobile station has been transferred to another zone, and then sends a level decay signal to the radio channel control station. In response, the control station sends a level monitor request to base stations around the base station generated the level decay signal. As such base stations send their received levels to the control station, the control station compare them and selects one of the base stations whose received level is highest. Subsequently, the control station sets up a path between the switching office and the base station selected, and then commands the previous base station to disconnect the channel.

A mobile station memorizes the current base station code at all times. Assume that the mobile station has traversed a given zone or location registration area, which is a location identification unit. Then, the mobile station compares a base station code with the memorized base station code and determines that it has traversed the zone on the basis of a change of base station code. Then, the mobile station sends a location registration signal, including a mobile station identification number, to a base station toward which it is moving. The base station at the destination transfers the location registration signal to the switching office via the control station. The switching office selects a home memory station associated with the mobile station identification number and then transfers the location registration signal to the home memory station. In response, the home memory station updates the location information relating to the mobile station. Further, the switching office received the location registration signal returns a confirmation signal to the mobile station to cause it to update the base station code.

The conventional cellular radio telephone communication system described above has some problems left unsolved, as follows. It has been customary to assign a particular frequency, or channel, to each of a plurality of nearby zones in order to avoid wave interference. To promote effective use of limited frequency resources, each zone should desirably be implemented as a microzone, as in a cordless telephone system, and should use the same frequency repeatedly. However, microzones increase the number of times that the frequency is switched due to the movement over adjoining zones, resulting in extra loads on both of base stations and mobile stations.

Another problem is that wave propagation troubles, e.g., fading and shadowing obstruct the radio communication between a base station and a mobile station. Generally, in a cellular radio telecommunications system, a substantially circular zone is assigned to each base station and has a diameter of several kilometers to several ten kilometers. This prevents cordless telephones or similar small-power portable telephones from being applied to such a zone configuration, since wave propagation distance available therewith is limited.

Moreover, to accommodate a greater number of subscribers, it is a common practice to increase the number of zones or base stations while reducing the size of each zone. However, the number of sites available for base stations is not great enough to further increase the number of subscribers.

SUMMARY OF THE INVENTION

It is, therefore, an object of the present invention to provide a mobile radio telecommunications system having unique zone architecture and channel assignment which allow base stations to be situated relatively easily, free base stations and mobile stations from extra loads otherwise needed to switch over frequency, and reduce wave propagation troubles.

It is another object of the present invention to provide a method of controlling call origination, call termination, zone and base station switchover, or hand-off, during conversation, and location registration.

A mobile radio telecommunications system of the present invention comprises a switching unit, a control station connected to the switching unit, a plurality of base stations connected to the switching unit, and a plurality of mobile stations connected to the plurality of base stations by radio channels. The base stations are respectively situated at private property, and each comprises a controller for determining a direction in which a mobile station is moving. The controller receives via the control station and switching unit information representative of the levels at which the base stations have received a radio wave from a mobile station, compares the received levels, determines, based on the result of comparison, that one of the base stations having the highest received level currently covers the mobile station, and determines a direction in which the mobile station is moving on the basis of a transition of the highest received level.

BRIEF DESCRIPTION OF THE DRAWINGS

The objects and features of the present invention will become more apparent from the consideration of the following detailed description taken in conjunction with the accompanying drawings in which.

DESCRIPTION OF THE PREFERRED EMBODIMENT

Figure 1:
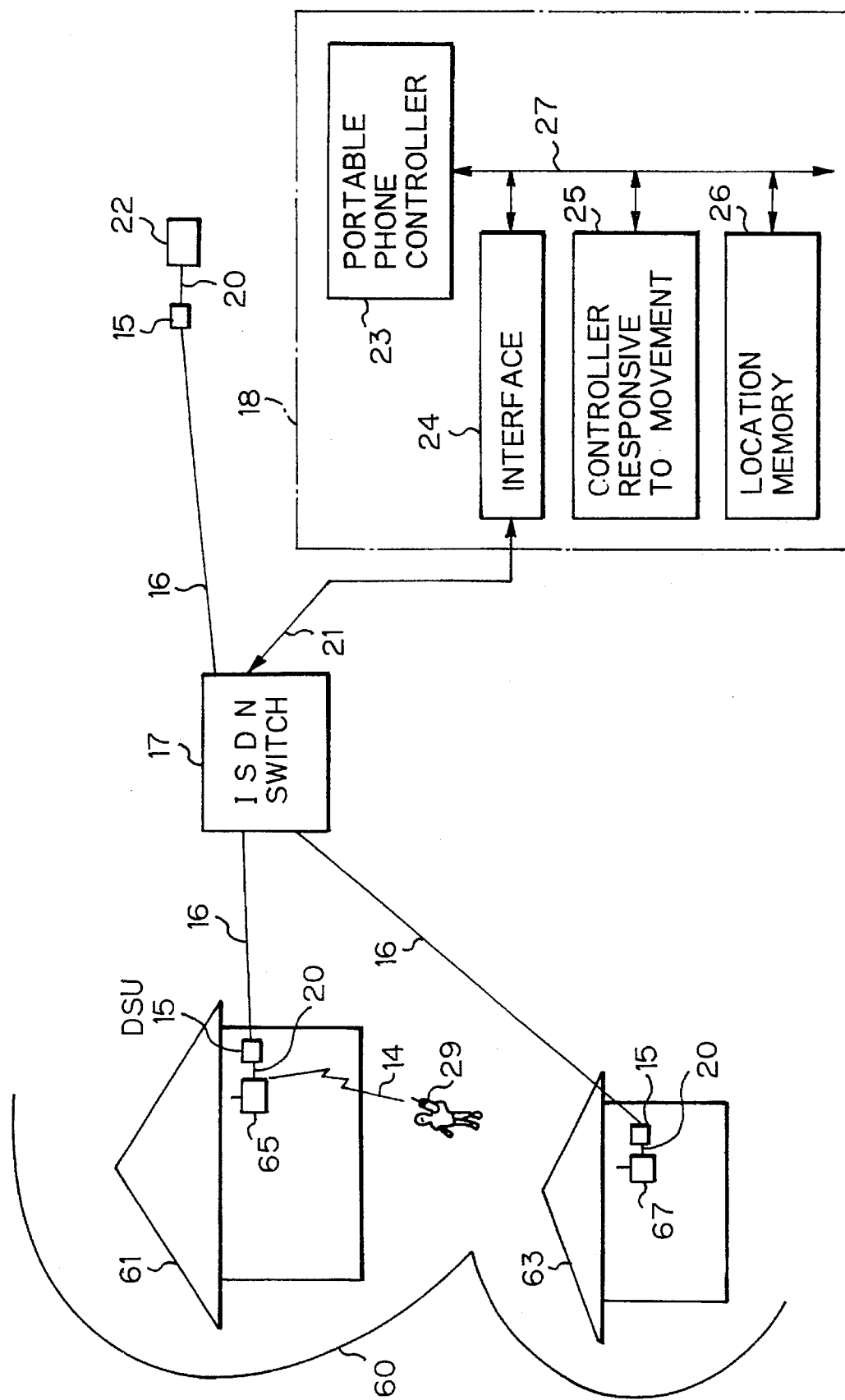
FIG. 1 is a block diagram schematically showing a mobile radio telecommunications system embodying the present invention.

Referring to FIG. 1 of the drawings, a mobile radio telecommunications system embodying the present invention is shown. As shown, the system includes an ISDN (Integrated Services Digital Network) switching unit 17 accommodating a digital telephone, or landline telephone, 22. A base station 65 is situated at, for example, a subscriber's house 61 which is located in a radio zone 60. A mobile station, or subscriber station, 29 is shown as existing in the radio zone 60 and implemented as a portable telephone by way of example. The system connects the portable telephone 29 and digital telephone 22 by a bidirectional radio channel 14 and an ISDN telephone network 16, thereby allowing a conversation to be held between the telephones 29 and 22. A DSU (Digital Service Unit) 15 is also installed in the subscriber's house 61. The base station 65 is connected to the mobile station 29 by the radio channel 14 and connected to the DSU 15 by a passive bus 20, which is a wire line, included in a user-network interface. In the illustrative embodiment, the user-network interface is implemented by an ISDN basic rate interface. Another DSU 15 is associated with the landline telephone 22 and connected to the switching unit 17 by the ISDN telephone network 16. In the embodiment, the telephone network 16 is constituted by two-wire metallic lines. The switching unit 17 accommodates the landline telephone 22 via the telephone network 16, DSU 15, and passive bus 20. Further, the switching unit 17 is connected to a control station 18 by a leased line 21.

Figure 2:
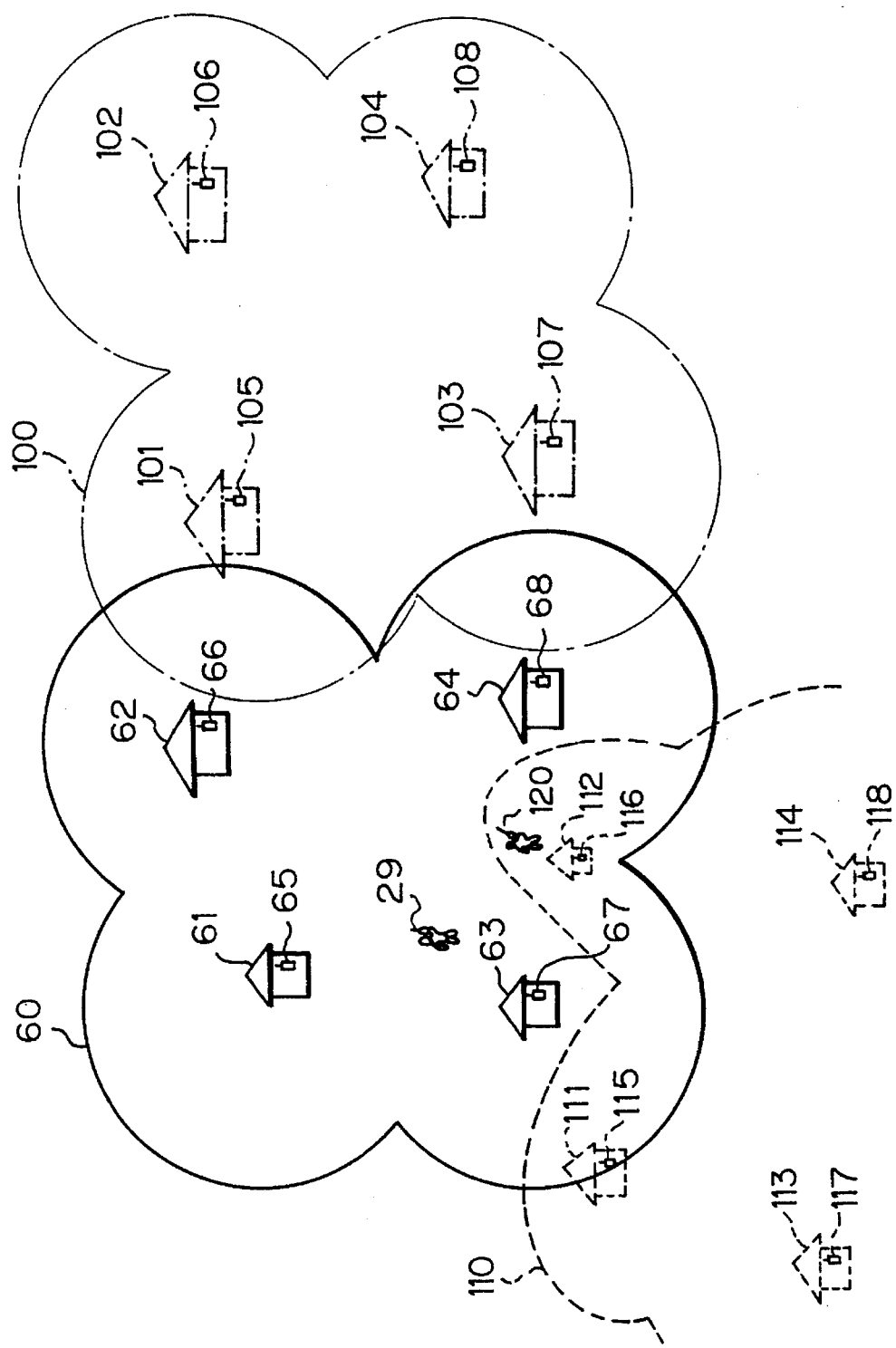
FIG. 2 shows a specific zone arrangement with which the embodiment is practicable.

FIG. 2 shows a radio zone architecture applicable to the system shown in FIG. 1. As shown, the zone 60, FIG. 1, is a composite zone consisting of microzones which are respectively assigned to base stations 66, 67 and 68 as well as the above-mentioned base station 65. Another composite zone 100 is made up of microzones respectively assigned to base stations 105, 106, 107 and 108. In this configuration, the embodiment handles four base stations included in a single composite radio zone as a group and covers the entire service area with a plurality of composite radio zones. If desired, the number of base stations constituting a single group may be more than or less than four, depending on the system scale, location and other conditions. In the illustrative embodiment, the four base stations belonging to the same group share at least a pair of transmission and reception frequencies for conversation, i.e., traffic channels, at least one paging channel available for terminating a call from the base station at the mobile station as well as for other purposes, and at least one access channel for allowing, for example, the mobile station to access the base station Nearby base station groups are different from each other in assigned frequencies or channels. Each base station group constitutes a location identification unit or location registration area. Hence, a particular location identification (ID) code is assigned to each base station group. All the base stations shown in FIG. 2 are connected to the switching unit 17, FIG. 1. Assuming that each microzone is substantially circular, microzones constituting a single composite radio zone or group may have a diameter of several hundred meters in consideration of the average duration of conversations and average walking distance.

Referring again to FIG. 1, each DSU 15 transforms a signal coming in through the passive bus 20 and having a transmission format matching an ISDN basic rate user-network interface to a signal having a transmission format matching time compression modulation and then sends the transformed signal to the telephone network 16. Also, the DSU 15 transforms a signal coming in through the telephone network 16 and having the time compression modulation format to a signal having the ISDN basic rate user-network interface format and then outputs the transformed signal to the passive bus 20. The ISDN or digital switching unit 17 operates in association with the control station 18 and base stations 65 and 67, as well as other base stations. For example, when a call is originated on the mobile station 29 or the landline telephone 22, the switching unit 17 sets up a channel between the mobile station 29 and the landline telephone 22 to allow them to hold a bidirectional communication. If desired, a plurality of digital switching units may be interposed between the mobile station 29 and the landline telephone 22 in a so-called network configuration.

As shown in FIG. 1, the control station 18 has a portable telephone controller 23, an interface 24, a controller 25 responsive to the movement of the mobile station 29, and a location memory 26. These constituents 23–26 of the control station 18 are connected together by an address/data bus 27. The control station 18 cooperates with the switching unit 17 and base stations 65 and 67 to perform various control functions, e.g., determines a direction in which the mobile station 29 is moving and registers the current location of the station 29, controls connection for calls originating and terminating, and control the switchover, or hand-off, of the zone while a conversation is held on the station 29.

Specifically, in the control station 18, the portable telephone controller 23 plays the role of a main control circuit and has a microprocessor, ROM (Read Only Memory), RAM (Random Access Memory) and so forth, although not shown specifically. The controller 23 controls the interface 24, controller 25 and location memory 26 via the address/data bus 27 in accordance with a program stored in the ROM. The interface 24 receives a MODEM signal from the switching unit 17 over the leased line 21, transforms the MODEM signal to a signal having an NRZ (Non-Retun to Zero) format, and then outputs it on the bus 27. At the same time, the interface 24 receives a signal having the NRZ format over the bus 27, converts it to a MODEM signal, and then produces the MODEM signal on the leased line 21. The controller 25 receives via the switching unit 17 data representative of the received levels of, for example, the base stations 65–68, FIG. 2, around the mobile station 29. In response, the controller 25 compares the receives levels of the four base stations 65–68 belonging to the same group. Further, the controller 25 sums up the received levels of the base stations 65–68 and compares the resulting total received level with the total received levels of the other base station groups. As a result, the controller 25 locates a current zone and a current base station where the mobile station 29 is present and, at the same time, determines the moving direction of the mobile station 29 on the basis of changes in the received levels of the base stations. The controller 25, therefore, plays the role of a comparing and data analyzing circuit. The data compared and analyzed by the controller 25 are transferred to the portable telephone controller 23 over the bus 27 to implement, for example, zone hand-off control during conversation or similar control. The location memory 26 has a RAM and a magnetic disk, not shown. Cooperating with the switching unit 17, the memory 26 stores, or registers, the current location of each mobile station, i.e., the current zone or group and current base station where the mobile station is present. In the illustrative embodiment, the memory 26 may also temporarily store and register the current locations of roamer stations which are not accommodated or registered at the switching unit 17. In the embodiment, the roamer stations refer to mobile stations which are accommodated in switching units other than the switching unit 17.

The digital landline telephone 22 has a control section made up of, for example, a microprocessor, ROM, RAM and so forth for controlling the entire telephone 22, an ISDN basic rate interface, a conversation circuit including a speaker, microphone and voice coder/decoder (CODEC) having a transmission rate of 64 kilobits per second (kb/s), and an operating section including keys for dialing, although none of them is shown specifically. These sections of the telephone 22 are connected together by an address/data bus, not shown. It is to be noted that the ISDN basic rate interface of the telephone 22 is connected to the passive bus 20, FIG. 1.

The mobile station, or portable telephone, 29 has an antenna for transmission and reception, a transceiver connected to the antenna, a main control section including a microprocessor, ROM, and RAM for controlling the entire station 29, a conversation circuit including a microphone and a speaker for sending and receiving a voice signal, and an operating section including keys for dialing, although not shown specifically. The telephone 29 may be implemented by any one of conventional communication systems, e.g., an FDMA (Frequency Division Multiple Access), TDMA (Time Division Multiple Access) or CDMA (Code Division Multiple Access) communication system. The mobile stations other than the mobile station 29 may be provided with the same construction as the station 29.

Figure 3:
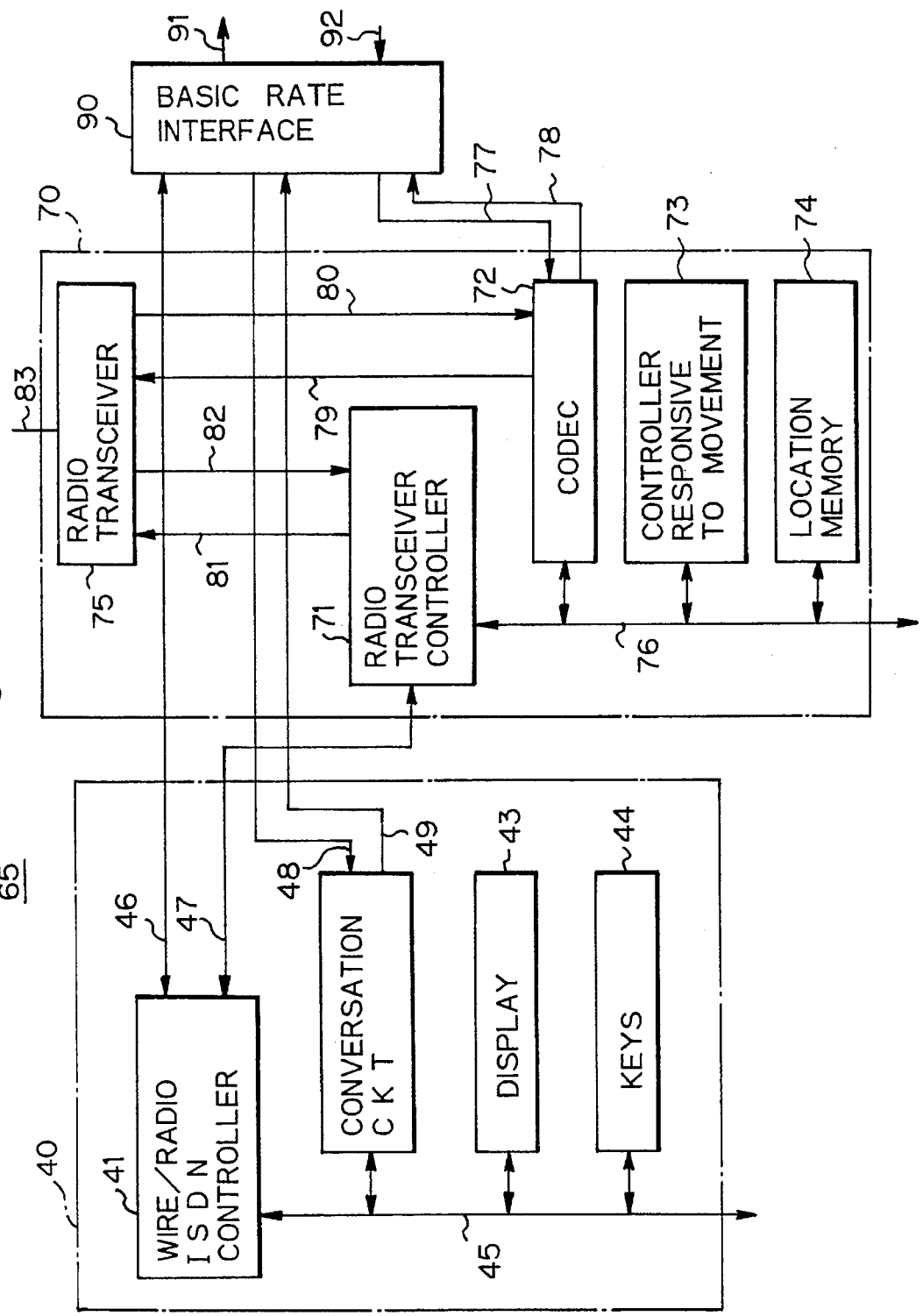
FIG. 3 is a block diagram schematically showing a specific construction of a base station included in the embodiment.

Referring to FIG. 3, a specific construction of the base station 65, FIG. 1, is shown. As shown, the base station 65 is generally made up of a digital wire telephone section 40, a portable telephone and base station section 70, and a basic rate interface 90. The other base stations may be provided with the same construction as the base station 65. The digital wire telephone section 40 has a wire/radio ISDN controller 41, a conversation circuit section 42, a display section 43, and a key section 44. These constituents 41–44 are interconnected by an address/data bus 45. The portable telephone and base station section 70 has a radio transceiver controller 71, a CODEC 72, a controller 73 responsive to the movement of the mobile station, a location memory 74, and a radio transceiver 75 connected to an antenna 83. These constituents 71–75 are connected together by an address/data bus 76. The telephone section 40 is implemented as a digital telephone set which a person present in the subscriber's house 61, for example, may use via the landline telephone 22 and basic rate interface 90. The portable telephone and base station section 70 serves as a base station and allows a conversation to be held between a portable telephone, not shown, carried by a person inside, for example, the subscriber's house 61 or the portable telephone 29, FIG. 1, carried by a person outside the house 61 and the landline telephone 22.

The basic rate interface 90 receives from the output 92 of the DSU 15, FIG. 1 a multiplexed 2B+D signal having a basic rate interface transmission format of AMI (Alternative Mark Inversion) code. First, the interface 90 converts an AMI code to an NRZ code. Subsequently, the interface 90 delivers a control signal on a D (signal) channel to an input/output 46, divides a signal on a 2B (data) channel into B1 and B2 channels, and delivers the divided signals to outputs 48 and 77, respectively. Also, the interface 90 receives a control signal on the D channel from the input/output 46 of the controller 41, a digital voice signal on the B1 channel from the output 49 of the conversation circuit section 42, and a digital voice signal on the B2 channel from the output 78 of the CODEC 72. Then, the interface 90 multiplexes the control signal and digital voice signals in a format conforming to the basic rate interface, transforms the NRZ code of the multiplexed signal to an AMI code, and produces the AMI code on an output 91. The interface 90, therefore, serves as a coding, decoding, multiplexing and demultiplexing circuit. The multiplexed 2B+D signal is transmitted at a rate of 192 kb/s. The B1 and B2 channels are each provided with a transmission rate of 64 kb/s while the D channel is provided with a transmission rate of 16 kb/s. In the illustrative embodiment, the interface 90 and DSUs 15 may be of the type adaptive to the ISDN primary rate user-network interface if the ISDN telephone network 16 are implemented by optical fibers and the ISDN primary rate user-network interface is used.

In the digital wire telephone section 40, the wire/radio ISDN controller 41 is a control circuit having, for example, a microprocessor, ROM, RAM and so forth, not shown, and controls the digital telephone section 40 and base station section 70. The controller 41 receives controls signals for the digital wire telephone set and mobile radio telecommunications system from the input/output 46 of the interface 90, a control signal for the wire telephone set from an input/output 45, and a control signal for the radio telecommunications system from the input/output 47 of the radio transceiver controller 71. In response, the controller 41 selectively produces control signals matching the input signals on the inputs/outputs 45, 46 and 47 thereof. The conversation circuit section 42 has a microphone, speaker and voice CODEC (64 kb/s) responsive to control signals from the controller 41, although not shown specifically. For example, as an analog voice signal is input on the microphone, the circuit section 42 converts it to a 64 kb/s PCM (Pulse-Code Modulation) signal, i.e., digital voice signal with the voice CODEC and produces the voice signal on an output 49. When the circuit section 42 receives a 64 kb/s digital voice signal from the output 48 of the interface 90, it transforms the voice signal to an analog voice signal with the voice CODEC and delivers the analog signal to the speaker, thereby outputting voice. The display section 43 has an LCD (Liquid Crystal Display) and an LCD control circuit. The display section 43 displays various kinds of information fed from the controller 41, e.g., the address of an incoming or outgoing call and a communication condition. The key operating section 44 includes at least keys for dialing a telephone number and feeds a dial signal to the controller 41.

The portable telephone and base station section 70 is constructed as follows. The radio transceiver controller 71 has, for example, a microprocessor, ROM, RAM and so forth, not shown, and controls the entire section 70. The controller 71 receives a control signal for the radio telecommunications system from the input/output 47 of the controller 41, a control signal for the portable telephone from an input/output 76, and a control signal for the radio telecommunications system from the output 82 of the radio transceiver 75. In response, the controller 71 produces control signals matching the input signals on the input/output 47, input/output 76, and output 81. The CODEC 72 is a voice CODEC (64 kb/s) responsive to control signals from the controller 71. Specifically, as the CODEC 72 receives an analog voice signal from the output 80 of the transceiver 75, it converts it to a 64 kb/s PCM signal and produces the PCM signal on the output 78. When a 64 kb/s digital voice signal is fed from the output 77 of the interface 90 to the CODEC 72, the CODEC 72 transforms it to an analog voice signal and produces the analog signal on the output 79. Further, in the illustrative embodiment, the CODEC 72 converts the received level of a radio wave from, for example, the mobile station 29 to four-bits digital data (sixteen levels) and feeds it to the input/output 76. The digital data on the input/output 76 is sent to the control station 18, FIG. 1, and a location memory 74, which will be described, under the control of the controller 71. The control station 18 receives digital data representative of received levels from, for example, four base stations 65–68, FIG. 2, around the mobile station 29 via the switch 17 and transfers them to the base stations 65–68 via the switch 17. The location memory 74 is implemented by a RAM by way of example and stores data necessary for the system. The digital data received from the control station 18 via the switch 17 are written to the location memory 74. Also written to the location memory 74 are information fed from the controller 73 and representative of the current base station where the mobile station 29 adjoins, a base station code assigned to the base station 65, and a location ID code representative of the location to which the station 65 belongs. The controller 73 reads, for example, data representative of the received levels of the four base stations (one unit) and fed from the location memory 74 and compares them to determine the current base station covering the mobile station 29. At the same time, the controller 73 determines the direction in which the mobile station 29 is moving on the basis of changes in the received levels due to the movement of the station 29. The controller 73, therefore, serves as a comparing and data analyzing circuit which determines, for example, which of the four base stations (one group) currently covers the mobile station 29 and the moving direction of the station 29. Further, the controller 73 determines whether the received level of each base station responsive to a radio wave from the mobile station 29 is higher or lower than a predetermined reference level.

The radio transceiver 75 is made up of a transmitting circuit and a receiving circuit although not shown in the figure. The transmitting circuit receives a control signal from the output 81 of the transceiver controller 71 and receives an analog voice signal from the output 79 of the CODEC 72. In response, the transmitting circuit modulates the control signal with a MODEM, modulates the output of the MODEM and analog voice signal by frequency modulation (FM) on a time division basis, amplifies the FM signal to predetermined power with a power amplifier for transmission, delivers the amplified FM signal to the transmit signal input terminal of a duplexer, and feeds the transmission frequency of the FM modulated signal or transmit signal to the antenna 83 via an antenna input/output terminal. In the illustrative embodiment, the transmission frequency of the FM modulated signal lies in a range of from 925 MHz to 940 MHz assigned to portable telephones in Japan. The receiving circuit receives a signal coming in through the antenna 83 via the input/output terminal of the duplexer. In the embodiment, the received signal has a frequency lying in a range of from 870 MHz to 885 MHz also assigned to portable telephones in Japan. The receiving circuit amplifies the received signal with an amplifier for reception, applies the amplified signal to an FM demodulator to demodulate it, feeds the resulting analog voice signal undergone FM demodulation to the output 80, further demodulates an FM control signal included in the FM demodulated output, and produces the demodulated control signal on the output 82. While the transceiver 75 is provided with an FDMA circuit configuration, it may alternatively be provided with a TDMA or CDMA configuration. If desired, the controllers 41 and 71 built in the base station 65 may be constructed into a single unit having a single microprocessor. Even the base station 65 and associated DSU 15 may be combined to constitute a single station. Moreover, the base station 65 may be situated inside or outside of the subscriber's house, as desired. This allows the base station 65 to be located at a desired place delicately selected from a relatively great number of places, thereby reducing radio wave propagation troubles and promoting the application of small-power portable telephones to the system.

A reference will be made to FIGS. 1 and 3 for describing how the system sets up connection when a call meant for the landline telephone 22 is originated on the telephone set 40 of the base station 65 installed in the subscriber's house 61. As a person operates the key section 44 for dialing, a calling signal is fed to the wire/radio ISDN controller 41 via the input 45 and then delivered to the output 46. The interface 90 inserts the calling signal on the input/output 46 into the D channel and then sends it out via the output 91. The calling signal is sent to the switching unit 17 via the DSU 15 as a call set-up request signal. On receiving this request signal, the switch 17 sends a call set-up indication signal to the landline telephone 22, thereby calling it. Then, in response to an off-hook operation, the landline telephone 22 returns a response request signal to the switching unit 17. On receiving the response request signal, the switching unit 17 sends a response indication signal to the base station 65. The response indication signal arrives at the controller 41 along the same route as, but in the opposite direction to, the calling signal. In response, the controller 41 recognizes that the communication channel has been set up between the telephone set 40 and the landline telephone 22. In this condition, a conversation is held between the telephone set 40 and the landline telephone 22 by using the B1 channel or B2 channel of the basic rate interface. Since this communication is implemented by the digital wire telephone network, the control station 18 does not directly join in the connection procedure.

The operation of the system to occur when the mobile station or portable telephone 29 accesses the landline telephone 22 will be described with reference also made to FIGS. 1–3. Assume that a person carrying the telephone 29 has operated the keys arranged on the telephone 29 to dial the number of the landline telephone 22. Then, a main control section, not shown, built in the telephone 29 acquires the paging channel of a base station adjoining the telephone 29 via an antenna and a radio transceiver thereof, not shown. By using the designated access channel, the telephone 29 sends the dial signal of the landline telephone 22 and information representative of the telephone number of the telephone 29 to base stations surrounding it via the radio transceiver and antenna. The base stations around the mobile station 29, i.e., base stations 65–68 in the embodiment receive the in formation on the access channel. The system may be constructed such that the access channel assigned to the base stations 65–68 may also be assigned to the base stations surrounding the stations 65–68, in which case the stations around the stations 65–68 will also receive the information on the access channel.

The base stations around the mobile station 29 each receives the information on the access channel from the mobile station 29 via the output 82 of the radio transceiver 75 connected to the antenna 83. The transceiver controller 71 included in the base station section 70 adds the base station code assigned to the base station and information representative of the received level at the base station to the information received over the access channel, e.g., the dial signal of the landline telephone 22 and the telephone number or ID number of the mobile station 29. The resulting output of the controller 71 is fed to the wire/radio ISDN controller 41 via the input/output 47 as a control signal. The controller 41 recognizes that the input control signal is meant for the radio telecommunications system, and then applies it to the interface 90 via the input/output 46. The interface 90 inserts the control signal, including the dial signal of the landline telephone 22, the telephone number of the mobile station 29, the base station code and the received level, into the D channel and sends it via the output 91 as a call set-up request signal. The call set-up request signal on the D channel is sent to the switching unit 17 via the DSU 15. On receiving the request signal, the switching unit 17 recognizes that the input signal is a control signal meant for the radio telecommunications system, modulates the signal with a MODEM, not shown, and then sends the modulated signal to the control station 18 over the leased line 21.

The control signal modulated by the MODEM of the switch 17 and sent over the leased line 21 arrives at the interface 24 of the control station 18. The interface 24 changes the format of the input control signal to the NRZ format and then outputs it on the address/data bus 27. The control signal on the bus 27 is once received by the portable telephone controller 23. The controller 23 feeds the telephone number of the mobile station 29, base station code and received level information, which are carried by the received control signal, to the controller 25 over the bus 27. In response, the controller 25 compares the base station groups with respect to the total received level of four base stations, selects one of the groups having the highest total received level, compares the received levels of the four base stations belonging to such a group, and then determines that the mobile stations 29 is currently located at one of the four base stations having the highest received level. At the same time, the controller 25 determines a moving direction of the mobile station 29 on the basis of the transfer of the base station having the highest received level and derived from the travel of the station 29. Further, the controller 25 delivers the code of the base station having the highest received level to the controller 23 over the bus 27. The controller 23 feeds at least the telephone number of the mobile station 29 and the base station code associated with the mobile station 29 to the location memory 26 over the bus 27. As a result, the memory 26 stores the latest base station code associated with the mobile station 29. In addition, the controller 23 sends a control signal, including at least the base station code associated with the mobile station 29, to the switching unit 17 over the leased line 21. In response to this control signal, the switching unit 17 calls the landline telephone 22 by sending a call set-up indication signal over the D channel. When the landline telephone 22 is off-hook, it returns a response request signal to the switch 17 over the D channel. In response, the switch 17 transfers, over the D channel, the control signal received from the control station 18 to the base station (65 in the embodiment) whose zone currently covers the mobile station 29. The base station 65 recognizes that the mobile station 29 exists in the zone thereof on the basis of the base station code which is included in the received control signal. Then, the base station 65 sends information designating a particular traffic channel to the mobile station 29 over the paging channel. In response, the mobile station 29 tunes itself to the designated traffic channel. After determining that the particular traffic channel has been set up between the mobile station 29 and the base station 65, the switching unit 17 sets up a traffic path between the landline telephone 22 and the base station 65 adjoining the mobile station 29. The traffic path between the base station 65 and the landline telephone 22 is implemented by the B1 channel or the B2 channel. In this condition, a conversation is held between the mobile station 29 and the landline telephone 22.

The control station 18 is informed of the received levels of the four base stations 65–68 of the same group derived from, for example, an originating call from the mobile station 29. In the illustrative embodiment, the control station 18 transfers all of the four received levels to each of the base stations 65–68. At this instant, each base station is capable of determining which of the base stations belonging to the same group has the highest received level. Hence, the base station whose received level is highest knows that the mobile station 29 exists in the zone thereof, and sends traffic channel information to the mobile station 29 over the paging channel to cause it to set a particular traffic channel. After determining that the particular traffic channel has been set up between the mobile station 29 and the base station of interest 65, the switching circuit 17 sets up a traffic path, i.e., B1 or B2 channel between the base station 65 and the landline telephone 22. Then, a conversation is held between the mobile station 29 and the landline telephone 22. It will be seen from the above that conversations can be held between, for example, landline telephones over the B1 channel and between portable telephones over the B2 channel at the same time.

In the event of terminating a call at a mobile station, the mobile station should be called on the basis of the location where it exists in order to eliminate invalid call to the other locations. For this purpose, the illustrative embodiment registers the location information of mobile stations at the base stations or the control station by the following procedure.

In the embodiment, each group consisting of four base stations constitutes a location identification unit or location registration area. The location of a mobile station is registered when the station is moved over nearby location registration areas and when a call is originated on the mobile station or the power switch of a portable telephone is turned on. The base stations belonging to the individual location registration areas are each reporting a location ID code over a paging channel. For example, when the mobile station constantly memorizing the current location ID code is moved across a location registration area or registration zone, it compares a location ID zone from a base station with a location ID code stored therein to detect a change of ID code. On determining that the mobile station has traversed the zone, it sends a registration signal, including the telephone number or ID number thereof and the location ID code of the destination, to base stations situated at the destination. Each base station received the registration signal compares it with a location ID code assigned thereto and, if the former is identical with the latter, writes the telephone number or ID number of the mobile station in the location memory 74 thereof. In the illustrative embodiment, a registration signal including the telephone number or ID number of the mobile station stored in the memory 74, a base station code and a location ID code, is sent from the base station to the control station 18 via the switching unit 17. On receiving the registration signal, the control station 18 writes it in the location memory 26 thereof.

A first connection procedure available with the embodiment for terminating a call from the landline telephone 22 at the mobile station 29 will be described hereinafter. To begin with, the telephone number of the portable telephone is dialed on the dial keys of the landline telephone 22. The telephone number entered on the telephone 22 is sent to the switching unit 17 via the DSU 15 over the D channel as a call set-up request signal. The switching unit 17 determines that the input request signal is a control signal meant for the radio telecommunications system, modulates it with the MODEM, not shown, and then sends the modulated control signal to the control station 18 over the leased line 21. The control signal from the switching unit 17 is received by the interface 24 of the control station 18 and then routed to the portable telephone controller 23 over the address/data bus 27. In response, the controller 23 accesses the location memory 26 with the telephone number of the portable telephone 29 so as to see a location ID code assigned to the group of four base stations. Further, the controller 23 sends a control signal, including the telephone number of the mobile station 29 and at least the location ID code of the four base stations of the same group, to the switching unit 17 over the leased line 21. In response, the switching unit 17 sends a call set-up indication signal, including the telephone number of the mobile station 29, to the four base stations (65–68 in the embodiment) over the D channel via the DSU 15.

In each base station received the information from the switching unit 17 over the D channel, the wire/radio ISDN controller 41 determines that the received control signal is meant for the radio telecommunications system, and delivers it to the radio transceiver controller 71 via the output 47 thereof. In response, the controller 71 determines that the input control signal is a call request signal designating the portable telephone 29. Further, the controller 71 produces access channel information and the telephone number of the mobile station 29 on the output 81 thereof. The access channel information and telephone number are sent to the mobile station 29 via the antenna 83 over the paging channel. The mobile station 29 is off-hook on receiving the telephone number thereof. Then, the mobile station 29 sends a call termination response signal to the base stations surrounding it over the designated access channel.

Each base station received the response signal from the mobile station 29 generates a control signal including the telephone number of the mobile station 29, the base station code assigned thereto, and information representative of the received level thereof. The base station transfers this control signal to the control station 18 via the DSU 15 and switching unit 17 over the D channel by the same procedure as described previously in relation to a call originated on the mobile station 29 and meant for the landline telephone 22. In response to the control signal, the controller 25 of the control station 18 compares the adjoining groups with respect to the total received level of four base stations, selects four base stations belonging to the same group having the highest total received level, and then compares the received levels of the individual base station of the group to determine which of them has the highest received level. The mobile station 29 is present in the radio zone assigned to the base station having the highest received level. Further, the controller 23 sends a control signal, including the telephone number of the mobile station 29 and the code of the base station whose radio zone contains the mobile station 29, to the switching unit 17 over the leased line 21. The switching unit 17 transfers the input control signal to the base station whose zone contains the mobile station 29 (base station 65 in the embodiment) over the D channel.

On receiving the control signal from the switching unit 17, the base station 65 recognizes that the mobile station 29 is present in the radio zone thereof by referencing the base station code included in the control signal. Then, the base station 65 sends information designating a particular traffic channel to the mobile station 29 over the paging channel. In response, the mobile station 29 tunes itself to the designated traffic channel. When the switching unit 17 recognizes that the traffic channel has been set up between the mobile station 29 and the base station 65, it sets up a traffic path between the base station 65 and the landline telephone 65. This traffic path is implemented by the B1 or B2 channel. In this condition, a conversation is held between the mobile station 29 and the landline telephone 22.

A second connection procedure available with the embodiment for terminating a call originated on the landline telephone 22 at the mobile station 29 is as follows. From the step of originating a call on the landline telephone 22 to the step of sending a call set-up request signal from the switching unit 17 to the control station 18 are the same as in the first connection procedure. In the second procedure, in response to the call set-up request signal, the control station 18 accesses the location memories 74 of the base stations group by group so as to see the location ID code of the current group containing the mobile station 29. Subsequently, the call is terminated at the mobile station 29 by the same sequence of steps as in the first connection procedure.

Referring again to FIG. 2, a mobile station, or portable telephone, 120 is shown as communicating with a base station 116 lying in a composite radio zone 110. Assume that the mobile station 120 is moved from the zone 110 to the zone where the base station 67 is situated, while holding the communication. Then, the system switches the zone while the communication is under way, as follows. The controller 73 of the base station 116 detects that the received level of the station 116 responsive to the radio wave from the mobile station 120 has lowered below a predetermined reference level. Information representative of this occurrence is delivered from the controller 73 to the controller 71. In response, the controller 71 determines that the received level has decayed, generates a level decay signal, and then produces it on the output 47. On receiving the level decay signal via the input 47, the controller 41 recognizes that the signal is a control signal meant for the radio telecommunications system, and sends it to the control station 18 via the DSU 15 and switching unit 17.

At the control station 18 received the control signal, the controller 25 compares the groups around the mobile station 120 with respect to the total received level of four base stations, and then compares the individual base stations of one of the groups having the highest received level. By this procedure, the controller 25 determines that the mobile station 120 exists in the radio zone of the base station having the highest received level (base station 67 in the embodiment). At the same time, the controller 25 is informed of the zone which the mobile station 120 has entered, i.e., a location ID code assigned to the zone 60 on the basis of the transfer of the highest received level. Information representative of the zone 60 is delivered from the controller 25 to the controller 23. On receiving this information together with other information, the controller 23 sends to the switching unit 17 a control signal including a signal commanding traffic channel acquisition, the telephone number of the mobile station 120, and the code of the base station 67 currently covering the mobile station 120.

On receiving the control signal from the control station 18, the switching unit 17 transfers it to the base station 67 over the D channel. In response, the base station 67 determines that a hand-off request has occurred, acquires a traffic channel, and then sends an end-of-acquisition signal to the control station 18 via the switching unit 17. The control station 18 received the end-of-acquisition signal sends a channel switch signal to the switching unit 17, requesting it to switch the channel to the base station 67. Further, by using the traffic channel of the previous base station 116, the control station 18 sends a traffic channel switch signal, including new traffic channel information, to the mobile station 120 via the switching unit 17. The mobile station 120 switches the traffic channel thereof to a new traffic channel, as instructed by the control station 18. In this condition, the communication on the portable telephone 120 is continued via the new base station 67.

Hereinafter will be described a second procedure available for switching the base station when the mobile station or portable telephone 120 has moved to the base station 67 while communicating with the base station 116, as stated above. At the base station 116, the controller 73 detects that the received level of the station 116 responsive to the radio wave from the mobile station 120 has lowered below the predetermined level. Then, the controller 73 examines the direction of movement of the mobile station 120 and sees that the station 120 has entered the zone 60. The controller 73 sends a level decay signal, including the location ID code of the zone 60 and the telephone number of the mobile station 120, to the control station 18. In response, the controller 25 of the control station 18 determines which of the base station groups around the mobile station 120 has the highest total received level, and then determines which of the four base stations of the group having the highest total received level is highest in received level. By this procedure, the controller 25 locates the base station whose zone currently covers the mobile station 120 (base station 67 in the embodiment). This is followed by the same sequence of steps as in the first zone switching procedure. In this manner, the embodiment switches the zone when a mobile station moves from one zone to another zone. This successfully reduces the number of times that the frequency is switched due to the movement of a mobile station over nearby zones, compared to the conventional system which switches the frequency every time the mobile stations moves from a microzone assigned to one bases station to a microzone assigned to another base station.

When the mobile station or portable telephone 29, FIG. 2, moves to the base station 65 in the radio zone 60 while communicating with the base station 67 lying in the same zone 60, the embodiment executes hand-off control, as follows. All the base stations 65–68 in the zone 60 are informed of which of them has the highest received level in relation to the mobile station 29, as well as the direction of movement of the station 29. Under these conditions, the base station 67 determines that the highest received level has been shifted from the base station 67 to the base station 65. Then, the base station 67 sends a level decay signal, including the code of the destination 65 and the telephone number of the mobile station 29, to the control station 18. This is followed by the same sequence of steps as in the first zone switching procedure described previously, except that the same traffic channel is used. The embodiment executes such hand-off control when a mobile station moves from one base station to another base station in the same zone while holding a communication. The control does not have to change the traffic channel despite the change of base station in the zone, thereby reducing the load on the mobile station. In addition, since the base stations are capable of dealing with the direction in which the mobile station is moving, the load on the control station is reduced.

In summary, in accordance with the present invention, a mobile radio telecommunications system allows base stations to be situated at ordinary subscribers' property. The system has a unique zone architecture in which a plurality of base stations constitute a group while a plurality of radio zones each consists of a plurality of microzones assigned to the base stations which belong to the same group. Further, the base stations belonging to the same group share the same radio channels. The system, therefore, does not need extra locations for the installation of base stations. Since the channels do not have to be switched between base stations of the same group, the number of times that the channels are switched is reduced. Further, the base stations and mobile stations, or portable telephones, which communicate with the radio zones need only small power. In addition, wave propagation troubles between the base stations and the mobile stations are reduced.

While the present invention has been described with reference to the particular illustrative embodiment, it is not to be restricted by the embodiment but only by the appended claims. It is to be appreciated that those skilled in the art can change or modify the embodiment without departing from the scope and spirit of the present invention. For example, while the embodiment has concentrated on a mobile station in the form of a portable telephone, the present invention is effectively practicable even with a cordless telephone, automobile telephone, pager system for interchanging information with mobile bodies, multichannel access system, navigation system, or automatic vehicle location system.

What is claimed is:

1. A mobile radio telecommunications system comprising:

a switching unit;

a control station connected to said switching unit;

a plurality of base stations connected to said switching unit; and a plurality of mobile stations connectable to said plurality of base stations by radio channels;

said plurality of base stations being respectively situated at private property, and each comprising first control means for determining a direction in which any one of said plurality of mobile station is moving;

said first control means receiving via said control station and said switching unit information representative of received levels at which said plurality of base stations have received a radio wave from any one of said plurality of mobile stations, comparing said received levels, determining, based on a result of comparison, one of said plurality of base stations having the highest received level to be a current base station currently covering the mobile station, and determining a direction in which said mobile station is moving on the basis of a transition of said highest received level;

wherein a plurality of radio zones are arranged each covering, among said plurality of base stations, a predetermined number of nearby base stations as a single group, said base stations of each group defining respective microzones which are combined to form a single zone, at least one location identification code and at least one base station code being respectively assigned to said single zone and each of said base stations, each group of base stations sharing same radio channels, different groups of base stations each using particular radio channels;

said first control means receiving at least the information representative of the received levels at which the base stations belonging to the same group as the base station including said first control means have received the radio wave from the mobile station, comparing said received levels in said group, determining, based on a result of comparison, one of said base stations having the highest received level to be a current base station currently covering said mobile station, and determining a direction in which said mobile station is moving in said group on the basis of a transition of said highest received level;

said base stations each further comprising first memory means for storing the base station code assigned thereto, the location identification code assigned to the group to which the base station belongs, and the base station code assigned to the base station having the highest received level which is determined by said first control means and changes due to a movement of the mobile station;

said control station comprising second control means for receiving the information representative of the received levels from said base stations via said switching unit, sending said information to each of said base stations via said switching unit, comparing one group currently covering the mobile station and the other groups surrounding said one group with respect to a total received level of said base stations belonging to the same group, determining that said mobile station is present in the group having the highest total received level, and determining a direction in which said mobile station is moving over the groups on the basis of a transition of said highest total received level; and second memory means for storing the location identification code assigned to the group having the highest total received level which is determined by said second control means and changes due to a movement of the mobile station.

2. A system in accordance with claim 1, wherein when a call is originated on any one of said mobile stations, said control station compares the total received levels of the individual groups, selects one of said individual groups having the highest total received level, selects one of the base stations belonging to said group having the highest received level, and commands said base station having the highest received level to respond to the call;

said control station causing said base station having the highest received level to respond to said mobile station or causing, in said group to which said base station belongs, each of the base stations to compare the received levels of said base stations of said group, and determine that said mobile station is present in one of said base stations having the highest received level, and causing said base station having the highest received level to respond to the call.

3. A system in accordance with claim 1, wherein to terminate a call at any one of said mobile stations, said control station determines the location identification code assigned to the group containing said mobile station by searching said first memory means or said second memory means, commands the base stations designated by said location identification code to call said mobile station, selects one of said base stations calling said mobile station and having the highest received level, and commands said base station having the highest received level to terminate the call at said mobile station.

4. A system in accordance with claim 1, wherein on receiving information indicative of a decay of received level from the base station which is communicating with the mobile station, said control station compares the total received levels of the groups around said mobile station, including the group to which said base station in communication belongs, selects one of said groups having the highest total received level, selects one of said base stations belonging to said group selected and having the highest received level, and commands said base station having the highest received level to acquire a traffic channel due to a movement of said mobile station or commands, when said base station in communication detects a decay of received level thereof and sends information representative of the group to which said mobile station has moved to said control station, one of said base stations belonging to said group to which said mobile station has moved and having the highest received level to acquire a traffic channel.

5. A system in accordance with claim 1, wherein when the base station communicating with the mobile station detects a decay of received level thereof and sends information representative of the base station to which said mobile station has moved to said control station, said control station commands said base station to which said mobile station has moved to acquire a traffic channel.

6. A system in accordance with claim 1, wherein the mobile station sends, when the location identification code received from the base station is not identical with the location identification code stored, said location identification code received to said base station or said control station for registering a location thereat.

7. A mobile radio telecommunications system comprising:

a switching unit for switching signals including a speech signal;

a plurality of base stations situated at private property and connected to said switching unit;

a plurality of mobile stations connectable to said plurality of base stations by radio channels; and a control station connected to said switching unit;

each of said plurality of base stations comprising:
receiver means for receiving a radio wave from said plurality of mobile stations and for determining, while receiving a radio wave conveying the speech signal produced by one of said plurality of mobile stations, a received level of the radio wave received from said one mobile station;
transmitter means for transmitting information representative of the received level of said one mobile station to said control station via said switching unit; and first control means for determining a direction in which any one of said plurality of mobile stations is moving;

said control station receiving said information of said one mobile station from said plurality of base stations via said switching unit;

said first control means receiving said information of said one mobile station from said control station via said switching unit, comparing said received levels included in said information received to determine one of said plurality of base stations which has the highest of said received levels to be a current base station currently covering said one mobile station, and determining a direction in which said one mobile station is moving on the basis of a transition of said highest received level.

* * * * *